US012041428B2

United States Patent
Ding et al.

(10) Patent No.: US 12,041,428 B2
(45) Date of Patent: Jul. 16, 2024

(54) HEARABLE eNOISE REDUCTION—BATTERY RIPPLE CONTAINMENT

(71) Applicant: Google LLC, Mountain View, CA (US)

(72) Inventors: Yao Ding, San Jose, CA (US); Arun Jayadev Rao, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 81 days.

(21) Appl. No.: 17/570,594

(22) Filed: Jan. 7, 2022

(65) Prior Publication Data
US 2023/0224638 A1 Jul. 13, 2023

(51) Int. Cl.
H04R 3/04 (2006.01)
H02M 1/14 (2006.01)
H04R 1/10 (2006.01)

(52) U.S. Cl.
CPC .............. *H04R 3/04* (2013.01); *H02M 1/14* (2013.01); *H04R 1/1025* (2013.01); *H04R 1/1083* (2013.01)

(58) Field of Classification Search
CPC ...... H04R 3/04; H04R 1/1025; H04R 1/1083; H02M 1/14
USPC ........................................................ 381/94.6
See application file for complete search history.

(56) References Cited

U.S. PATENT DOCUMENTS

| 10,506,324 B2 * | 12/2019 | Minoo ................ | H04R 1/1091 |
| 2013/0265105 A1 * | 10/2013 | Taubman ............. | H03H 11/04 |
| | | | 327/552 |
| 2015/0245129 A1 * | 8/2015 | Dusan ................. | G10L 21/0208 |
| | | | 381/71.6 |
| 2019/0115824 A1 * | 4/2019 | Ashkenazy ........... | H02M 1/15 |
| 2022/0229457 A1 * | 7/2022 | Palit ..................... | G05F 1/625 |

FOREIGN PATENT DOCUMENTS

| CN | 207692002 U | 8/2018 |
| CN | 208079335 U | 11/2018 |

OTHER PUBLICATIONS

Noise Suppression for Wireless Headphones. Murata. Retrieved on Oct. 22, 2021. 6 pages. Retrieved from the Internet: <https://www.murata.com/en-sg/products/emc/emifil/library/pickup/headphone>.

* cited by examiner

*Primary Examiner* — Carolyn R Edwards
*Assistant Examiner* — Friedrich Fahnert
(74) *Attorney, Agent, or Firm* — Colby Nipper PLLC

(57) ABSTRACT

The subject matter described herein provides systems and techniques for controlling the production of eNoise in an audio playback system. The eNoise may be an audible noise produced when a current, such as a noise/ripple current, flows through a battery of the audio playback system. Such eNoise may be reduced by limiting the current, such as noise/ripple current, flowing through the battery. In some examples, the noise/ripple current may be diverted to the main board of the audio playback system by adding a source of current. A circuit to produce such a current may include transistor(s), capacitor(s), and/or resistor(s). Using the current source and/or such a circuit may also divert the noise/ripple current away from the battery, thereby reducing the eNoise produced.

20 Claims, 8 Drawing Sheets

HEARABLE eNOISE REDUCTION—BATTERY RIPPLE CONTAINMENT

BACKGROUND

Electronic noise, also known as eNoise, may occur in audio playback systems. The eNoise may manifest itself in the form of a static and/or buzzing sound that may be heard by the user of the audio playback system as distortion during audio playback. In some examples, eNoise may cause users of the audio playback system a great deal of dissatisfaction with the quality of the audio playback system and its ability to play back audio. It may also cause these users irritation, discomfort, and disutility. In some examples, the presence of a battery in the audio playback system, along with a noise/ripple current flowing through the battery, may be a cause of the eNoise. The eNoise may be in the form of noise in or around the 800 Hz frequency and its harmonics. For example, a magnetic field generated by current flowing through the battery may interact with the magnet(s) of the audio playback system to produce the eNoise.

BRIEF SUMMARY

The present disclosure is directed to controlling the production of eNoise in an audio playback system. As described above, the eNoise may be an audible noise produced when a current, such as a noise/ripple current, flows through the battery used in the audio playback system. Such eNoise may be reduced by limiting the current, such as noise/ripple current, flowing through the battery of the audio playback system. In some examples, the noise/ripple current may be diverted to the main board of the audio playback system by adding a pseudo current source and/or a source of current, such a circuit. Such a circuit may include transistor(s), capacitor(s), and/or resistor(s). Using the pseudo current source and/or a source of current may also divert the noise/ripple current away from the battery used in the audio playback system. This may allow for any eNoise produced in the audio playback system to be reduced.

In general, one aspect of the subject matter described in this specification includes circuitry in an audio playback system. The circuitry may include a decoupling capacitor, a battery, and a current source. The decoupling capacitor may be associated with a system decoupling impedance. The battery may be electrically coupled in parallel with the decoupling capacitor. The battery may provide power to the audio playback system. The current source may be electrically coupled between the battery and the decoupling capacitor. The current source may reduce eNoise in the circuitry by producing a current directed away from the battery. The current source may reduce a ripple current flowing into the battery. The current source may be a circuit that includes a transistor, a capacitor, and at least one resistor. The transistor may be a bipolar junction transistor (BJT). The transistor may be a metal-oxide-semiconductor field-effect (MOSFET) transistor. The current that may be directed away from the battery is generated at a terminal of the transistor. The eNoise may be produced by a ripple current flowing through the battery. The current source may divert the ripple current towards the main board of the audio playback system. Battery monitoring circuitry may be coupled in series between the battery and the current source. The battery, the battery monitoring circuitry, and the current source may all be electrically coupled in parallel with the decoupling capacitor. The audio playback system may be an earbud.

Another aspect of the subject matter described in this specification includes a system for reducing eNoise in an audio playback system. The system may include a decoupling capacitor, a noise source, a battery, and a circuit. The decoupling capacitor may be associated with a system decoupling impedance. The noise source may be electrically coupled in parallel to the decoupling capacitor. The noise source may represent eNoise in the circuitry. The eNoise may be produced by a ripple current flowing through the battery. The battery may be electrically coupled in parallel with the decoupling capacitor and the noise source. The battery may provide power to the audio playback system. The circuit may be electrically coupled between the battery and the noise source. The circuit may reduce the eNoise in the circuitry by producing a current directed away from the battery. The circuit may include a transistor, a capacitor, and at least one resistor. The capacitor may be coupled between a base and an emitter of the transistor. The capacitor and a resistor of the at least one resistor may be coupled between a gate and a source of the transistor. The current directed away from the battery may be generated at the collector of the transistor. The current directed away from the battery may be generated at the drain of the transistor. The circuit may be associated with an impedance higher than the impedance of the battery and components between the battery and the circuit.

Yet another aspect of the subject matter includes a process for reducing eNoise in an audio playback system. Power may be provided to an audio playback system using a battery. A current directed away from the battery may be produced using a circuit that is coupled in series to the battery and in parallel with a decoupling capacitor. A ripple current that produces the eNoise may be diverted away from the battery and towards the main board of the audio playback system using the produced current. The current may be produced using a transistor, a capacitor, and at least one resistor within the circuit.

DETAILED DESCRIPTION

Figure 1:
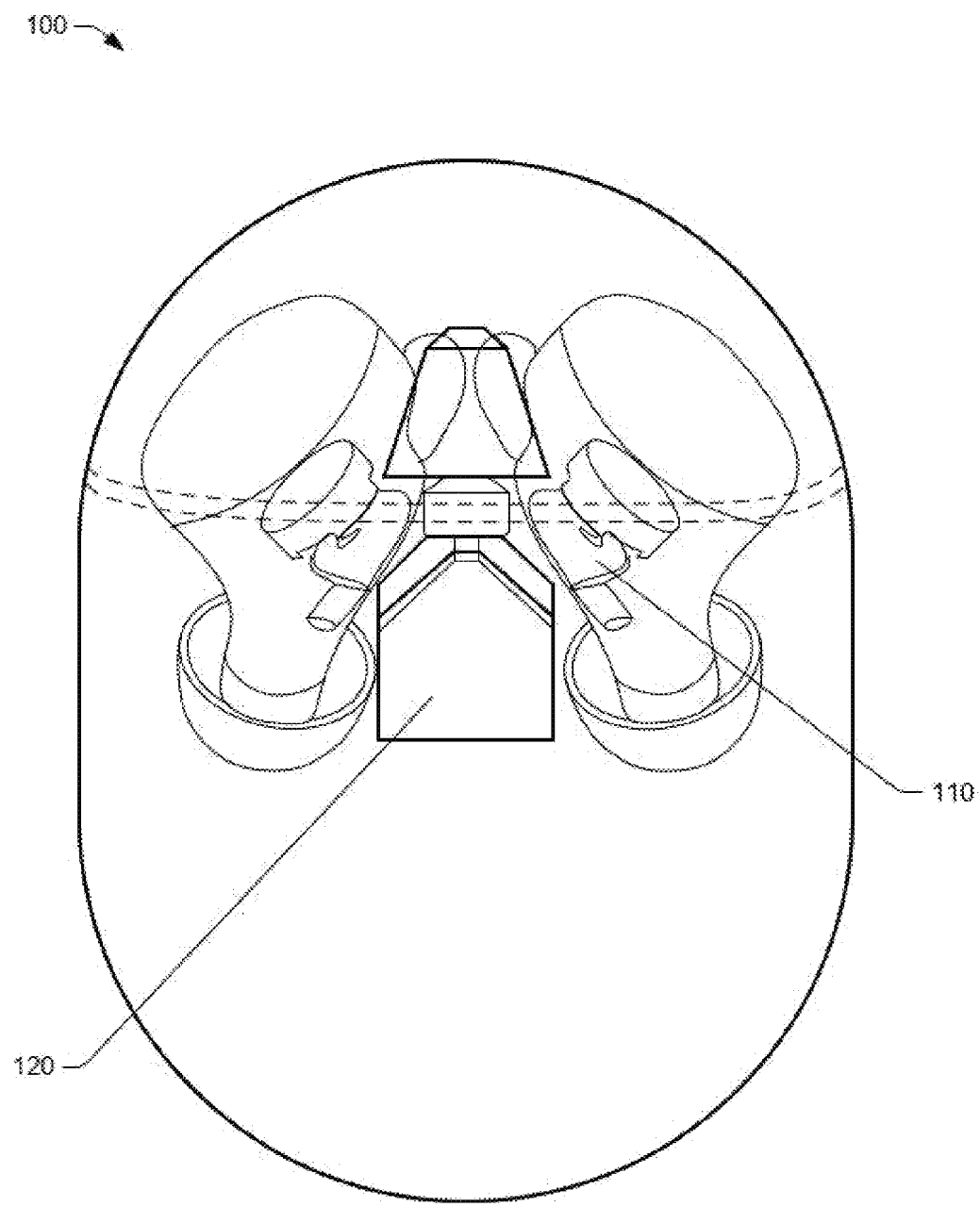
FIG. 1 depicts a side view of an audio playback system, such as an earbud.

FIG. 1 depicts a side view of an audio playback system 100, such as an earbud. Audio playback system 100 includes magnet(s) 110. Magnet(s) 110 may be used for generating audio signals and/or audio playback, assisting with generating an appropriate magnetic field for generating audio signals, and/or for securing the audio playback system 100 to a different device, such as a case that is used to hold and/or house audio playback system 100, or the like. Magnet(s) 120 may be within a case or other device that may be used to hold and/or house audio playback system 100. In some examples, magnet(s) 120 may interact with magnet(s) 110 to secure audio playback system 100 to the case. In some examples, magnet(s) 120 may interact with magnet(s) 110 for other purposes, such as initiating a particular event within audio playback system 100.

Figure 2:
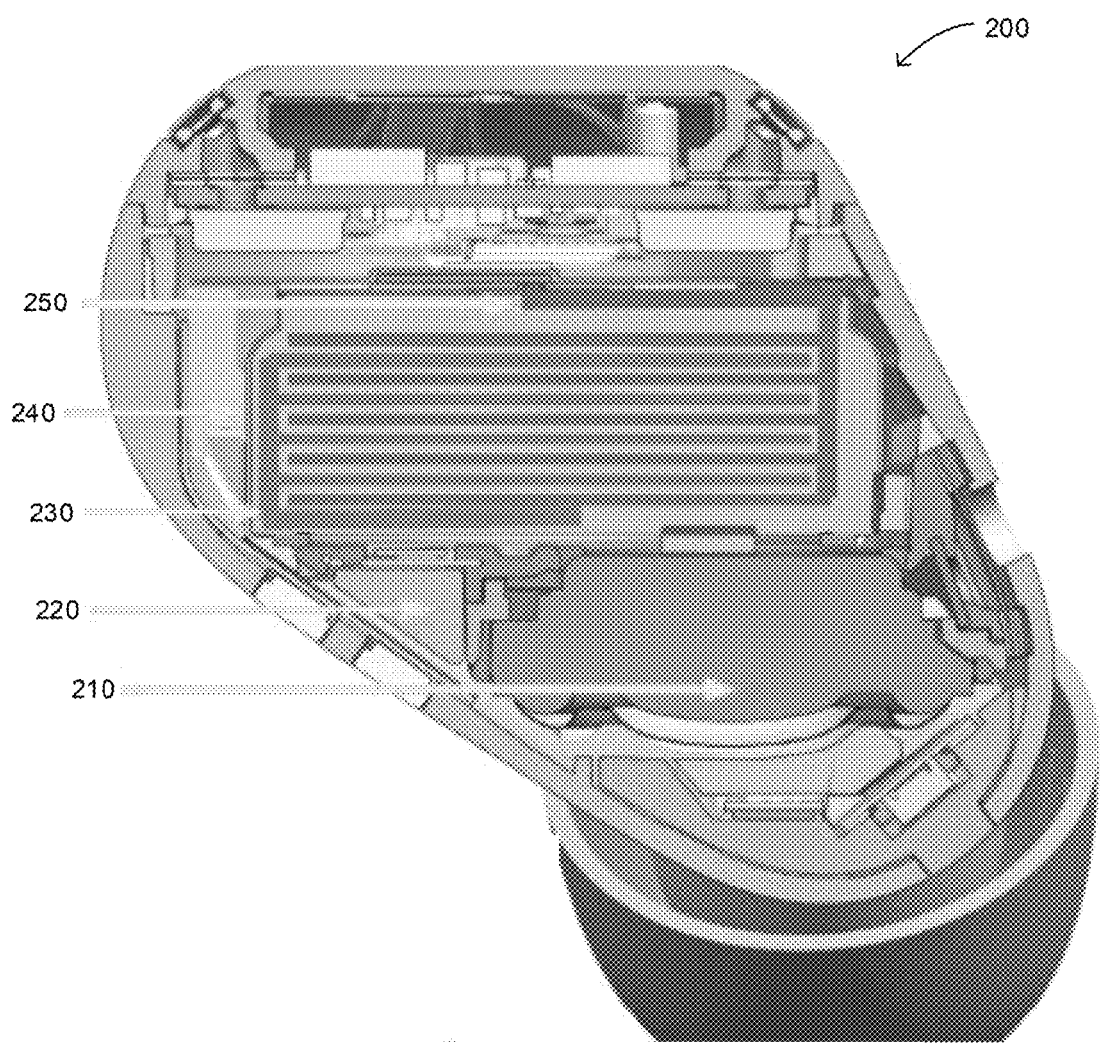
FIG. 2 depicts a cross-sectional view of an audio playback system, such as an earbud.

FIG. 2 depicts a cross-sectional view of an audio playback system 200, such as an earbud. Audio playback system 200 includes speaker 210, magnet(s) 220, battery internal P bus 230, battery 240, and battery internal N bus 250. The speaker 210 may be in electrical communication with component(s) within the audio playback system 200. These component(s) that are in electrical communication with the speaker 210 may provide signals to the speaker 210 to emit audio signals, such as sounds, noise signals, anti-noise signals, or the like. These emitted audio signals may be output by the audio playback system 200 and may enter a user's ear. Magnet(s) 220 may be used for generating audio signals and/or audio playback, assisting with generating an appropriate magnetic field for generating audio signals, and/or for securing the audio playback system 200 to a different device, or the like. The battery internal P bus 230 may include wiring, a thin film, or another component that includes a positive substrate.

Battery 240 may be a source of electric power consisting of one or more electrochemical cells with external connections for powering electrical devices. Battery 240 may be in electrical communication and/or used for powering component(s) within the audio playback system 200. Battery 240 may be a nickel cadmium (Ni—Cd) battery, a nickel metal hydride (Ni-MH) battery, a lithium ion (Li-ion), a smart battery, or any other type of battery. Battery 240 may be in close proximity to magnet(s) 220 and speaker 210 within the audio playback system 200. In some examples, the battery 240 may be a part of electrical circuitry within the audio playback system 200, and may have one or more currents generated by the electrical circuitry flowing through it. In some examples, the presence of the battery 240 in the audio playback system 200, as well as noise/ripple currents flowing through the battery, may be a cause of eNoise. In some examples, eNoise may be undesired noise generated by various electro-magnetic interactions between components within the audio playback system 200 and output through the speaker 210. For example, eNoise may be in the form of noise in or around the 800 Hz frequency, and its harmonics, output through the speaker 210. For example, a magnetic field generated by noise current/ripple current flowing through the battery 240 may interact with the magnet(s) 220 of the audio playback system to produce the eNoise via the speaker 210. For example, if the circuitry of the audio playback system was operating at 1 Khz, over 96% of the noise current/ripple current may flow through the battery 240. However, the systems and techniques, as described herein, may be used to control the eNoise by, for example, limiting the current, such as noise/ripple current, flowing through the battery 240. The battery internal N bus 250 may include wiring, a thin film, or another component that includes a negative bus summing bar.

Figure 3:
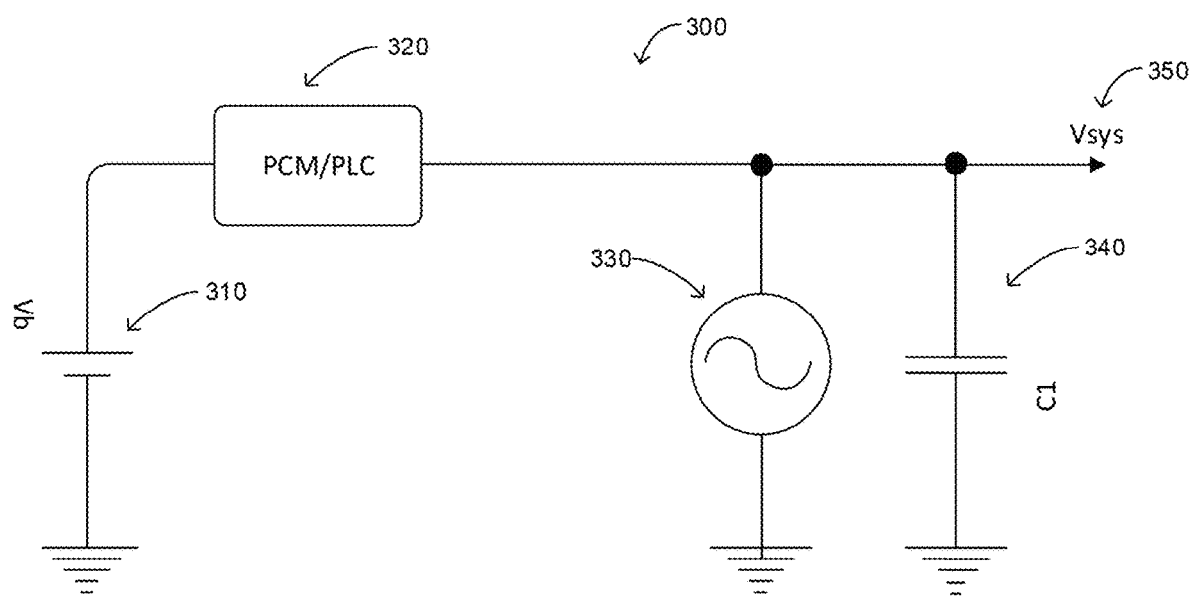
FIG. 3 depicts circuitry including a battery and a noise source within an initial audio playback system.

FIG. 3 depicts circuitry 300 including a battery 310 and a noise source 330 within an initial audio playback system. Circuitry 300 includes battery 310, protection circuit module (PCM)/power line communication (PLC) 320, noise source 330, capacitor 340, and system power rail 350. In some examples, as shown in the circuitry 300, the battery 310 and the PCM/PLC 320 may both be electrically connected in series, and both components may be connected in parallel with each of the noise source 330 and the capacitor 340. The battery 310 may be similar in form and function to the battery 240 described in connection with FIG. 2. In some examples, the PCM/PLC 320 may be any components and or circuitry of the circuitry 300 that are disposed between the battery, such as battery 310, and the other circuitry downstream of the battery. In some examples, the PCM/PLC 320 may include circuitry that monitors the state of component(s) of the circuitry 300, such as the battery 310, and may assist in protecting and/or controlling these component(s). The noise source 330 may be used to model a source of noise within the circuitry 300. For example, the noise source 330 may be used to model the eNoise described in connection with FIG. 2. The noise source 330 may model the noise on the system power rail 350. The capacitor 340 may be a decoupling capacitor, which may provide an impedance within the circuitry 300. The capacitor 340 may be used to model the total capacitance on the system power rail 350. For example, the capacitor 340 may include a total capacitance of C=7.2 uF, and this may be the total capacitance on the system power rail 350. The system decoupling impedance of the capacitor 340, Xc, may be computed using the formula Xc=1/(2*pi*f*C), where f is the frequency at which the circuitry 300 operates, and C is the capacitance of the capacitor 340. For example, if f=1 KHz, and C=7.2 uF, the system decoupling impedance Xc=22.1 ohms. The system power rail 350 may be one or more wires that provides power to an audio playback system, such as the audio playback system 200, described in connection with FIG. 2. In some examples, a noise/ripple current on the system power rail 350 may flow through the decoupling capacitor 340 and the battery 310. As described above, when this ripple current flows through the battery 310, it may create a magnetic field that may interact with other one or more magnets in an audio playback system to cause eNoise to be output. Continuing with the previous example, if the system decoupling impedance Xc=22.1, as described above, the battery 310 and the PCM/PLC 320 connection impedance may be approximately 0.8 ohms. Therefore, in this example, the battery impedance may be less than 4% of the system decoupling impedance when f=1 KHz.

Increasing the capacitance of the decoupling capacitor, such as decoupling capacitor 340, by 10× may reduce the system decoupling impedance, Xc, to around 2.2 ohms in the present example. This change may be made in an attempt to reduce the eNoise output by the speaker of the audio playback system by reducing the ripple current flowing through the battery 310 of the audio playback system. This change may increase the size of the decoupling capacitor 340 significantly, however, and it may not sufficiently reduce the eNoise. For example, this change may reduce the eNoise by about 25%.

Figure 4:
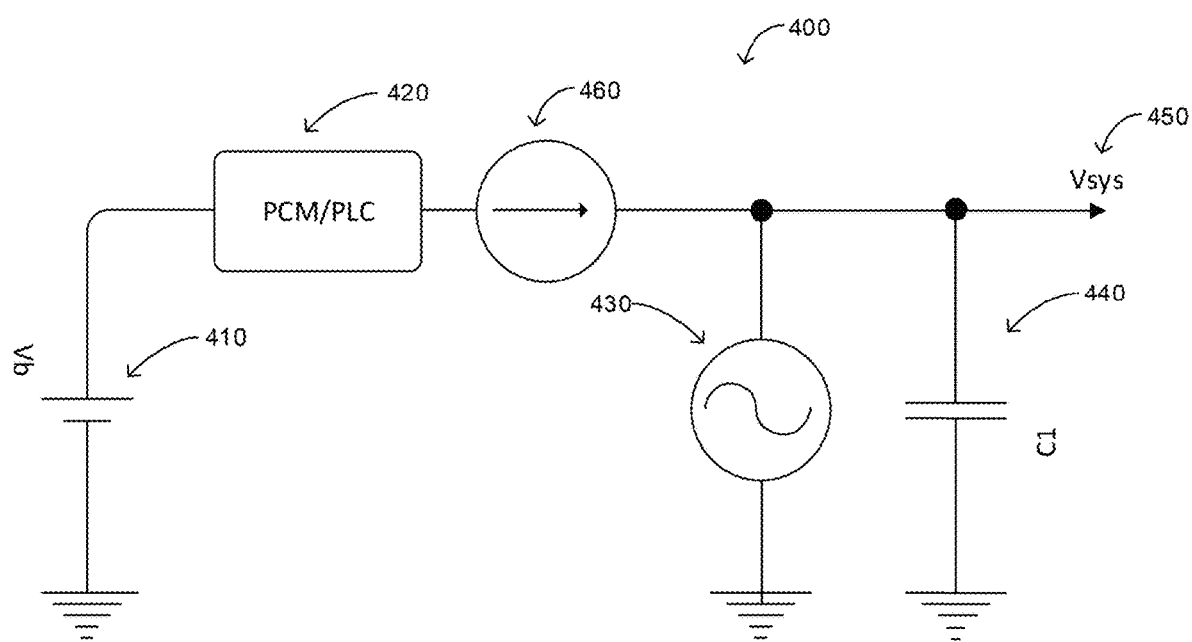
FIG. 4 depicts noise-reducing circuitry that includes a battery within an audio playback system.

FIG. 4 depicts noise-reducing circuitry 400 that includes a battery 410 within an audio playback system. The circuitry 400 includes battery 410, PCM/PLC 420, noise source 430, capacitor 440, system power rail 450, and current source 460. In some examples, as shown in the circuitry 400, the battery 410, the PCM/PLC 420, and the current source 460 may all be electrically connected in series, and all of these components may be connected in parallel with each of the noise source 430 and the capacitor 440. The battery 410 may be similar in form and function to the battery 240 described in connection with FIG. 2 and/or the battery 310 described in connection with FIG. 3. The PCM/PLC 420 may be similar in form and function to the PCM/PLC 320 described in connection with FIG. 3. The noise source 430 may be similar in form and function to the noise source 330 described in connection with FIG. 3. The noise source 430 may model the noise on the system power rail 450. The capacitor 440 may be a decoupling capacitor, which may provide an impedance within the circuitry 400. The capacitor 440 may be used to model the total capacitance on the system power rail 450. For example, the capacitor 440 may include a total capacitance of C=10 uF, and this may be the total capacitance on the system power rail 450. The system decoupling impedance of the capacitor 440, Xc, may be computed using the formula Xc=1/(2*pi*f*C), where f is the frequency at which the circuitry 400 operates, and C is the capacitance of the capacitor 440. For example, if f=1 KHz, and C=10 uF, the system decoupling impedance is Xc=15.9 ohms.

The system power rail 450 may include one or more wires that provide power to an audio playback system, such as the audio playback system 200, described in connection with FIG. 2. In some examples, a ripple current on the system power rail 450 may flow through the decoupling capacitor 440 and the battery 410. As described above, when this ripple current flows through the battery, it may create a magnetic field that interacts with the one or more other magnets in the audio playback system to create vibrations, which may output as noise. This eNoise may be represented by the noise source 430. The current source 460 may output a current flowing away from the battery 410 on the system power rail 450. For example, the current may be a 5 mA current. The current source 460 may be used to isolate, reduce, and/or eliminate this eNoise. In some examples, current source 460 may have a high or infinite impedance that may be a higher impedance than the impedance of the battery and other components that are upstream of the current source 460 in the circuitry 400. As a result, in some examples, the ripple current that may have normally flowed through the battery 410 to cause eNoise may instead be diverted away from the battery 410 and towards the main logic board of the audio playback system and dissipated through the decoupling capacitor 440. The current source 460 may be a pseudo-current source. The current source 460 may be implemented using any circuitry that outputs a current. In some examples, the current source 460 may be implemented by circuitry that includes transistor(s), resistor(s), and/or capacitor(s).

Figure 5:
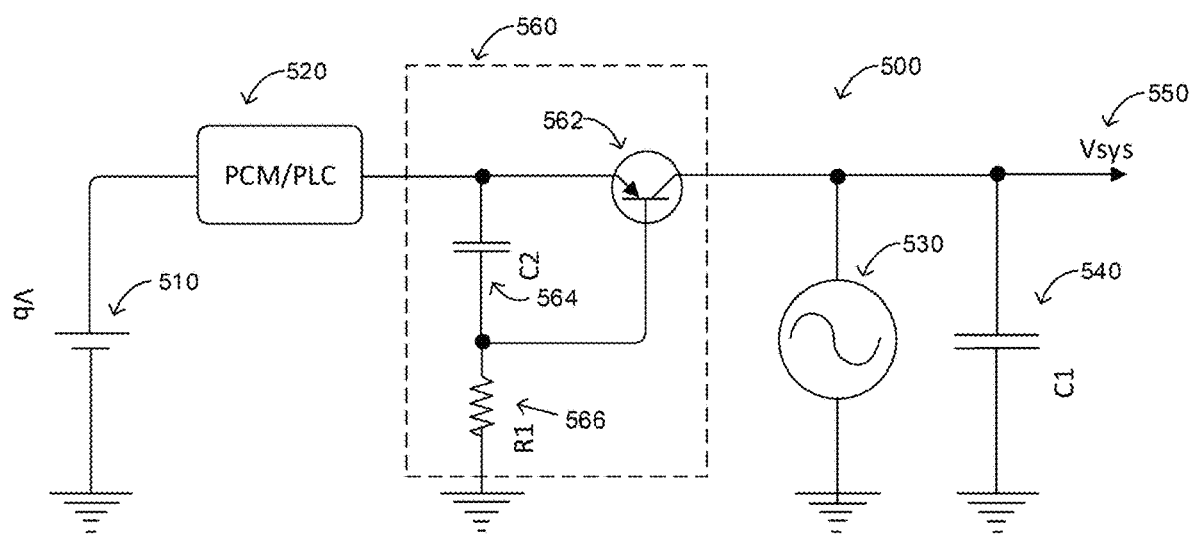
FIG. 5 depicts a first noise-reducing circuit that includes a transistor circuit and a battery within an audio playback system.

FIG. 5 depicts a first noise-reducing circuit 500 that includes a transistor circuit 560 and a battery 510 within an audio playback system. The circuitry 500 includes battery 510, PCM/PLC 520, noise source 530, capacitor 540, system power rail 550, and circuit 560. The circuit 560 may include a transistor 562, such as a PNP type bipolar junction transistor, a capacitor 564, and a resistor 566. In some examples, as shown in the circuitry 500, the battery 510, the PCM/PLC 520, and the circuit 560 may all be electrically connected in series, and all of these components may be connected in parallel with each of the noise source 530 and the capacitor 540. The battery 510 may be similar in form and function to the battery 240 described in connection with FIG. 2 and/or the battery 310 described in connection with FIG. 3. The PCM/PLC 520 may be similar in form and function to the PCM/PLC 320 described in connection with FIG. 3. The noise source 530 may be similar in form and function to the noise source 330 described in connection with FIG. 3. The noise source 530 may model the noise on the system power rail 550. The capacitor 540 may be a decoupling capacitor, which may provide an impedance within the circuitry 500. The capacitor 540 may be used to model the total decoupling capacitance on the system power rail 550. For example, the capacitor 540 may include a total decoupling capacitance of C1=10 uF, and this may be the total decoupling capacitance on the system power rail 550. The system decoupling impedance of the capacitor 540, Xc, may be computed using the formula Xc1=1/(2*pi*f*C), where f is the frequency at which the circuitry 500 operates, and C1 is the capacitance of the capacitor 540. For example, if f=1 KHz, and C1=10 uF, the system decoupling impedance Xc1=15.9 ohms. The system power rail 550 may be one or more wires that provides power to an audio playback system, such as the audio playback system 200, described in connection with FIG. 2. In some examples, a ripple current on the system power rail 550 may flow through the decoupling capacitor 540 and the battery 510. As described above, when this ripple current flows through the battery, it may create a magnetic field that interacts with one or more other magnets in an audio playback system to cause eNoise to be output by the speaker of the audio playback system. This eNoise may be represented by the noise source 530.

The circuit 560 may include a transistor 562, such as a PNP type bipolar junction transistor, a capacitor 564, and a resistor 566. In some examples, as shown in circuit 560, a first terminal of the capacitor 564 may be connected to the emitter of the transistor 562 and a second terminal of the capacitor 564 may be connected to the base of the transistor 562 as well as a terminal of the resistor 566. The collector of the transistor 562 may be connected to a terminal of the noise source 530. In some examples, the capacitor 564 may have a capacitance of C2, and the resistor 566 may have a resistance of R1. For example, C2=10 uF. The circuit 560 may output a current Ic from, for example, the collector of the transistor 562. In the circuit 560, the base current, Q1 Ib, of the transistor 562 may be controlled by using the beta of transistor 562 multiplied by the difference of battery voltage, Vbatt, and the transistor 562 base emitter voltage, Vbe, divided by the resistance, R1, of the resistor 566. Here, the beta of transistor 562 may be an amplification factor between the base current and the collector current of the transistor. In particular, Ib=beta*[(Vbatt−Vbe)/R1]. The capacitor 564 may clamp the base emitter voltage, Vbe, of the transistor 562. This may allow the current, Ic, output from the collector of the transistor 562, to act as a current source, such as the current source 460 described in connection with FIG. 4.

The current output from the collector of transistor 562, Ic, may flow away from the battery 510 on the system power rail 550. The circuit 560 and/or the current Ic may be used to isolate, reduce, and/or eliminate the eNoise, described above. In some examples, the circuit 560 may have a high impedance that may be a higher impedance than the impedance of the battery and other components that are upstream of the circuit 560 in the circuitry 500. As a result, in some examples, the ripple current that may have normally flowed through the battery 510 to cause eNoise, may instead be diverted away from the battery 510 and towards the main logic board of the audio playback system because of the circuit 560 and/or the current Ic.

Figure 6:
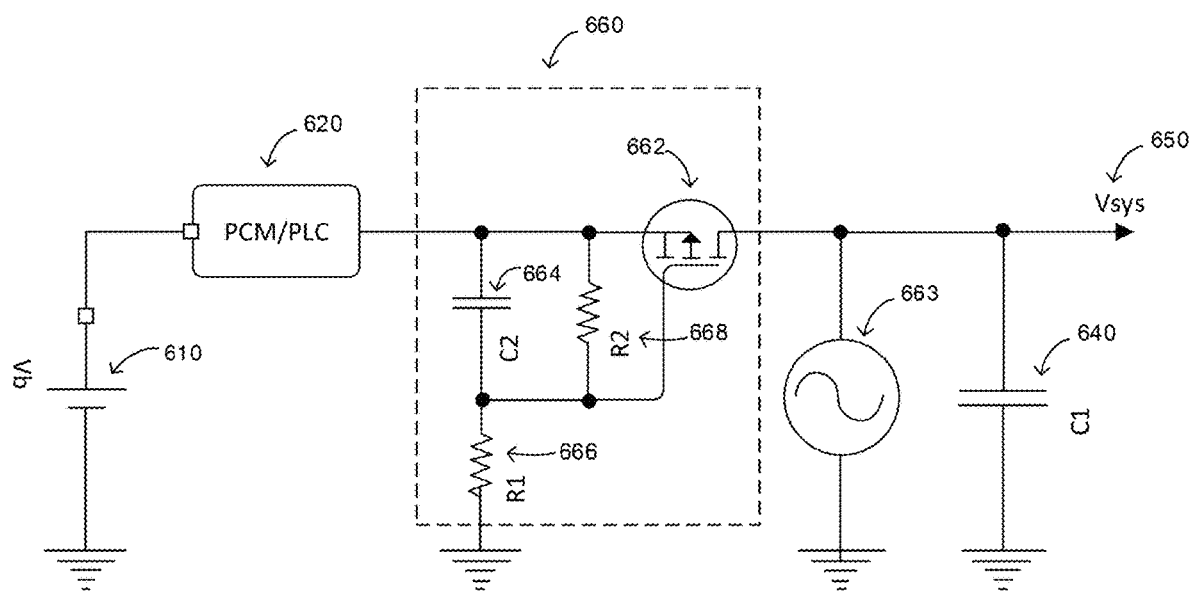
FIG. 6 depicts a second noise-reducing circuit that includes a transistor circuit and a battery within an audio playback system.

FIG. 6 depicts a second noise-reducing circuit 600 that includes a transistor circuit 660 and a battery 610 within an audio playback system. The circuit 600 includes battery 610, PCM/PLC 620, noise source 630, capacitor 640, system power rail 650, and circuit 660. The circuit 660 may include a transistor 662, such as a P-channel metal-oxide-semiconductor field-effect (MOSFET) transistor, a capacitor 664, and resistors 666 and 668. In some examples, as shown in circuit 660, a first terminal of the capacitor 664 may be connected to the source of the transistor 662 as well as a first terminal of resistor 668, and a second terminal of the capacitor 664 may be connected to the gate of the transistor 662 as well as a second terminal of the resistor 668 along with a terminal of resistor 666. The drain of the transistor 662 may be connected to a terminal of the noise source 630.

In some examples, as shown in the circuitry 600, the battery 610, the PCM/PLC 620, and the circuit 660 may all be electrically connected in series, and all of these components may be connected in parallel with each of the noise source 630 and the capacitor 640. The battery 610 may be similar in form and function to the battery 240 described in connection with FIG. 2 and/or the battery 310 described in connection with FIG. 3. The PCM/PLC 620 may be similar in form and function to the PCM/PLC 320 described in connection with FIG. 3. The noise source 630 may be similar in form and function to the noise source 330 described in connection with FIG. 3. The noise source 630 may model the noise on the system power rail 650. The capacitor 640 may be a decoupling capacitor, which may provide an impedance within the circuitry 600. The capacitor 640 may be used to model the total decoupling capacitance on the system power rail 650. For example, the capacitor 640 may include a total decoupling capacitance of C1=10 uF, and this may be the total decoupling capacitance on the system power rail 650. The system decoupling impedance of the capacitor 640, Xc, may be computed using the formula Xc1=1/(2*pi*f*C), where f is the frequency at which the circuitry 600 operates, and C1 is the capacitance of the capacitor 640. For example, if f=1 KHz, and C1=10 uF, the system decoupling impedance Xc1=15.9 ohms. The system power rail 650 may be one or more wires that provides power to an audio playback system, such as the audio playback system 200, described in connection with FIG. 2. In some examples, a ripple current on the system power rail 650 may flow through the decoupling capacitor 640 and the battery 610. As described above, when this ripple current flows through the battery, it may create a magnetic field that interacts with the one or more other magnets in an audio playback system to cause eNoise to be output by the speaker of the audio playback system. This eNoise may be represented by the noise source 630.

The circuit 660 may include a transistor 662, such as a P-channel MOSFET transistor, a capacitor 664, and resistors 666 and 668. In some examples, the transistor 662 may have a floating gate. In some examples, the capacitor 664 may have a capacitance of C2, the resistor 666 may have a resistance of R1, and the resistor 568 may have a resistance of R2. For example, C2=10 uF and/or R2 may be a large value. The circuit 660 may output a current, Id, from for example, the drain of the transistor 662. In the circuit 660, the open circuit output voltage of the gate of the transistor, Q1 Vg, may be controlled by using the product of base voltage, Vb, of the transistor, and the second resistance, R2, of the resistor 668 divided by the sum of both resistances, R1+R2, where R1 is the first resistance of the resistor 666. In particular, Vg=Vb*R2/(R1+R2). In some examples, the particular design of circuit 660, including a MOSFET transistor with a floating gate, may reduce or eliminate leakage currents. Such leakage currents may otherwise drain battery 610, and may occur in circuits similar to circuit 660 designed with other types of transistors. In addition, in some examples, the particular design of circuit 660 may allow for the use of a capacitor 664 with a relatively small capacitance. This may allow for the reduction of the space and/or surface area used by such a capacitor and thereby may allow for the reduction in the size of the circuit 660 and the circuitry 600.

The capacitor 664 may clamp the open circuit output voltage, Vg, of the transistor 662. This may allow the current, Id, output from the drain of the transistor 662, to act as a current source, such as the current source 460 described in connection with FIG. 4. The current output from the drain of transistor 662, Id, may flow away from the battery 610 on the system power rail 650. The circuit 660 and/or the current Id may be used to isolate, reduce, and/or eliminate the eNoise, described above. In some examples, the circuit 660 may have a high impedance that may be a higher impedance than the impedance of the battery and other components that are upstream of the circuit 660 in the circuitry 600. As a result, in some examples, the ripple current that may have normally flowed through the battery 610 to cause eNoise, may instead be diverted away from the battery 610 and towards the main logic board of the audio playback system because of the circuit 660 and/or the current Id.

Using the systems and techniques to divert the ripple current away from the battery used in an audio playback system, as presented herein, may significantly reduce eNoise. For example, using such systems and techniques in real-world systems, eNoise may be reduced by approximately 17 dB or more or less.

Figure 7:
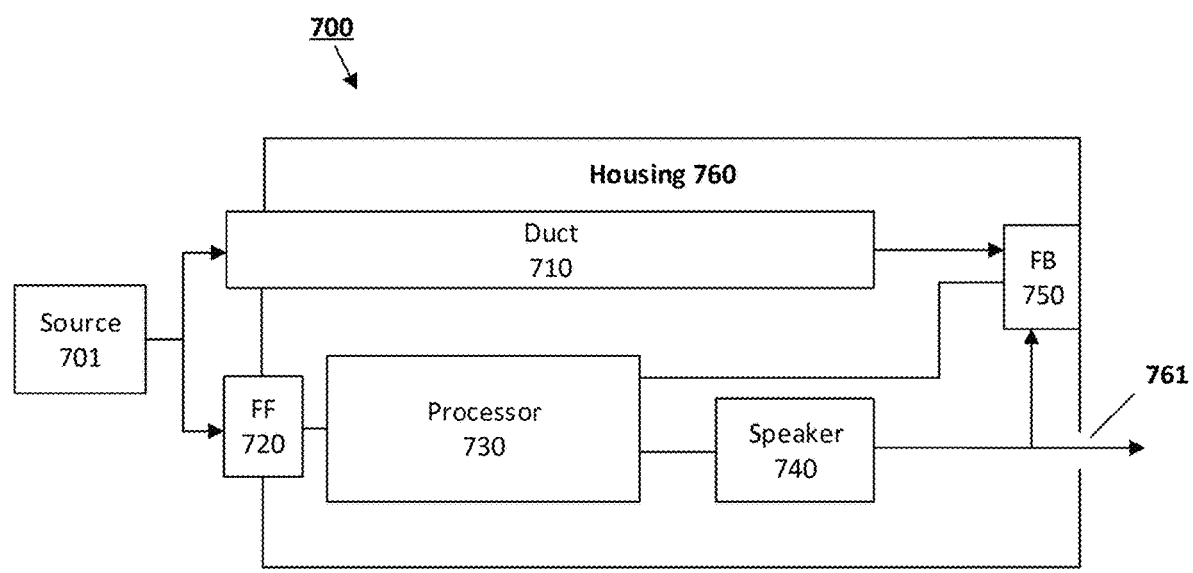
FIG. 7 depicts a schematic illustration of an audio playback system in accordance with aspects of the disclosure.

FIG. 7 depicts a schematic illustration of audio playback system 700. The audio playback system may be similar to audio playback system 100 described in connection with FIG. 1, and/or audio playback system 200 described in connection with FIG. 2, and/or other audio playback systems described herein. The audio playback system 700 may include a housing 760 that contains various components of the system, including duct 710, feedforward microphone 720, processor(s) 730, speaker 740, and feedback microphone 750. Source 701 may include audio information external to housing 760, including ambient noise or the like. Audio playback system 700 may be a speaker, a headphone, an earbud, or the like. Although not shown, audio playback system 700 may communicate with a computing device, such as a mobile phone, a tablet, a smart watch, or the like. The computing device may provide audio playback system 700 with instructions to output sounds, such as voices, music, podcasts, system alert sounds, other audio signals, or the like.

The audio playback system 700 may include other components that are not shown in FIG. 7, such as a communication interface, wireless transceiver, or the like. In some examples, audio playback system 700 may include a system memory, a bus, networking interface(s), and other components (not shown), such as storage(s), output device interface(s), input device interface(s). A bus may be used for communicating between the processor(s) 730, the system memory, the networking interface(s), and other components. Any or all components of audio playback system 700 may be used in conjunction with the subject of the present disclosure. In some examples, the audio playback system 700 may include circuitry 300, 400, 500, and/or 600, described above. In some examples, the components within the audio playback system may be powered by the battery in circuitry 300, 400, 500, and/or 600, described above.

Processor(s) 730 may be of any type including but not limited to a tensor processing unit (TPU), a microprocessor, a microcontroller, a digital signal processor (DSP), or any combination thereof. The processor(s) 730 may include one more level of caching, such as a level one cache and a level two cache, a processor core, and registers. The processor core may include one or more arithmetic logic unit (ALU), one or more floating point unit (FPU), one or more DSP core, or any combination thereof. A memory controller may also be used with the processor(s) 730, or in some implementations the memory controller can be an internal part of the processor(s) 730. Depending on the desired configuration, the physical system memory in the audio playback system 700 may be of any type including but not limited to volatile memory, such as RAM, non-volatile memory, such as ROM, flash memory, etc., multiple of these memories, other memory technology, or any combination thereof. The physical memory may include an operating system, one or more applications, and program data, which may include service data. The physical memory may be used by the processor(s) 730 to operate aspects of audio playback system 700. The program data may be non-transitory computer-readable medium program data, and may include instructions that, when executed by the processors(s) 730, implement any process or technique described herein, such as process 800, described in connection with FIG. 8, for reducing eNoise in an audio playback system. In some examples, the one or more applications may be arranged to operate with program data and service data on an operating system.

Feedforward microphone 720, feedback microphone 750, and speaker 740 may be in electrical communication with processor(s) 730. Such electrical communication may enable processor(s) 730 to analyze noise received by feedforward microphone 720 and feedback microphone 750 while also providing signals to speaker 740 to emit audio signals, such as to emit an anti-noise signal and sounds. Feedforward microphone 720 may be housed along a surface of housing 760 and may face away from the housing. Feedforward microphone 720 may receive external noise directly from source 701. Feedback microphone 750 may be housed within housing 760 and may face an interior portion of the housing. Feedback microphone 750 may receive external noise from source 701 through duct 710, audio signals from speaker 740, and/or other residual noise within housing 760.

Housing 760 may include an exit opening 761 leading from an interior of the housing to the exterior of the housing. As such, exit opening 761 may allow for output from speaker 740 to exit audio playback system 700. For example, where audio playback system 700 is an earbud, exit opening 761 may allow for output audio to enter a user's ear from speaker 740. In some examples, processor(s) 730 may include an active noise cancellation (ANC) system that may reduce or remove noise for the user of the audio playback system 700 based on the external noise received from the feedforward microphone 720 and/or the feedback microphone 750. Using these microphones, the ANC system may emit an anti-noise audio signal from ambient noise, and may add this signal to the audio output of the audio playback system 700 so that it may cancel or reduce noise at the eardrum of the user. In addition, these microphones may be used to generate a correction audio signal from residual noise at the speaker of the audio playback system. The correction audio signal may also be added to the audio output of the audio playback system so that it may cancel or reduce noise at the eardrum of the user. The system/circuitry and techniques, as described herein, may improve the functioning of an audio playback system, such as audio playback system 700, by also reducing eNoise for the user of the audio playback system 700.

Figure 8:
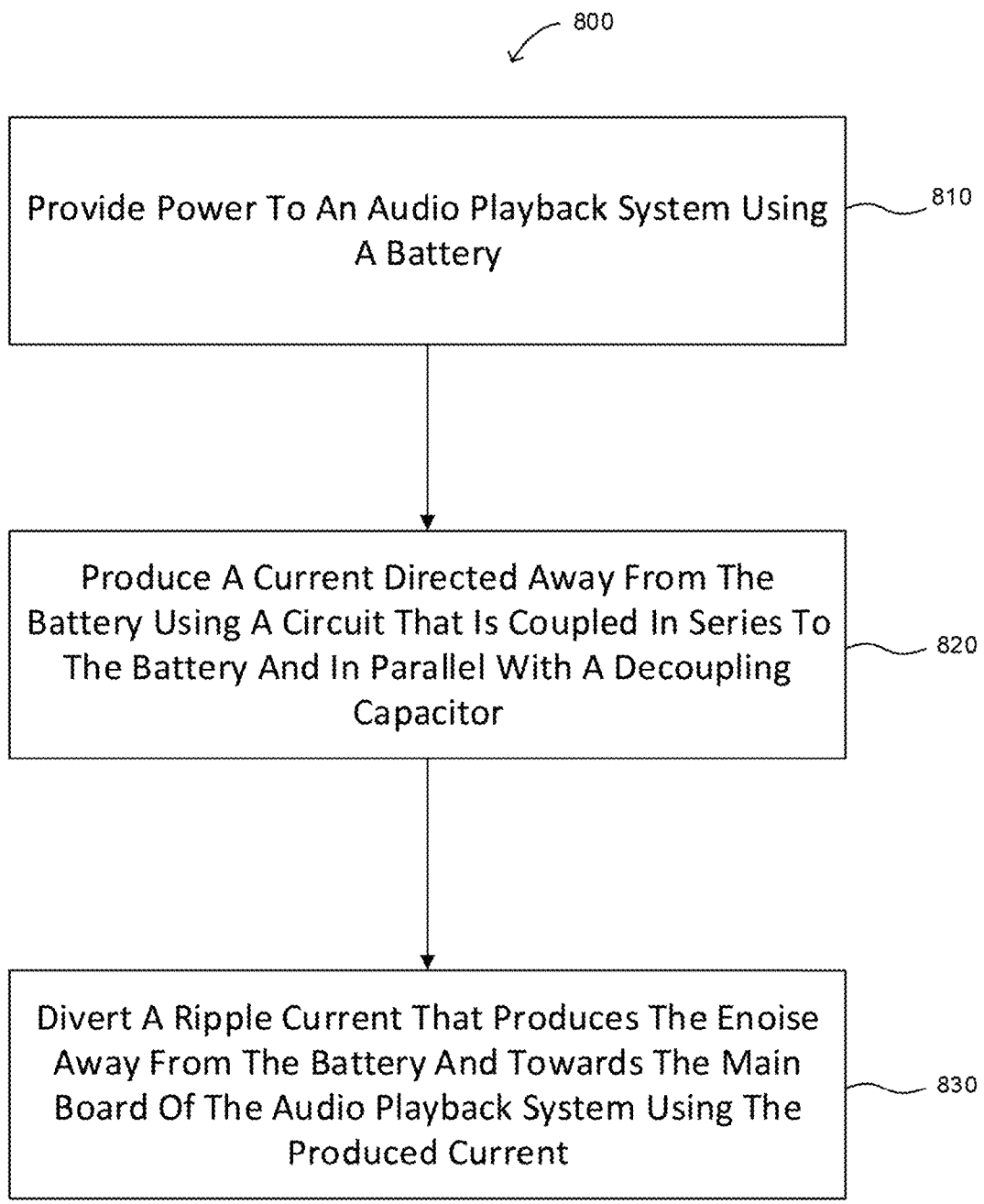
FIG. 8 is a flow diagram of an example process for reducing eNoise in an audio playback system.

FIG. 8 is a flow diagram of example process 800 for reducing eNoise in an audio playback system. While the operations of the process 800 are described in a particular order, it should be understood that the order may be modified and operations may be performed in parallel. Moreover, it should be understood that operations may be added or omitted.

In block 810, power may be provided to an audio playback system using a battery. For example, power may be provided by the batteries described in connection with circuitry 300, 400, 500, 600, and/or 700, described above.

In block 820, a current directed away from the battery may be produced using a circuit that is coupled in series to the battery and in parallel with a decoupling capacitor. The current may be produced using a transistor, a capacitor, and at least one resistor within the circuit. For example, the current may be produced by a current source, such as current source 460 described in connection with FIG. 4. For example, the current may be produced by a circuit, such as circuit 560 described in connection with FIG. 5 and/or circuit 660 described in connection with FIG. 6.

In block 830, a ripple current that produces the eNoise may be diverted away from the battery and towards the main board of the audio playback system using the produced current. For example, as described in connection with FIG. 4, the ripple current that may have normally flowed through the battery 410, may instead be diverted away from the battery 410 and towards the main logic board of the audio playback system by the current source 460. For example, as described in connection with FIG. 5, the ripple current that may have normally flowed through the battery 510, may instead be diverted away from the battery 510 and towards the main logic board of the audio playback system because of the circuit 560 and/or the current Ic. For example, as described in connection with FIG. 6, the ripple current that may have normally flowed through the battery 610, may instead be diverted away from the battery 610 and towards the main logic board of the audio playback system because of the circuit 660 and/or the current Ic.

Aspects of the present disclosure may be implemented as a computer implemented process, a system, or as an article of manufacture such as a memory device or non-transitory computer readable storage medium. The computer readable storage medium may be readable by an electronic device and may comprise instructions for causing an electronic device or other device to perform processes and techniques described in the present disclosure. The computer readable storage medium may be implemented by a volatile computer memory, non-volatile computer memory, solid state memory, flash drive, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The invention claimed is:

1. Circuitry in an audio playback system, the circuitry comprising:
   a decoupling capacitor associated with a system decoupling impedance;
   a battery, electrically coupled in parallel with the decoupling capacitor, the battery providing power to the audio playback system; and
   a current source electrically coupled between the battery and the decoupling capacitor, wherein the current source reduces eNoise in the circuitry by producing a current directed away from the battery, the current source comprising:
      a current source capacitor;
      a resistor electrically coupled in series with the current source capacitor; and
      a transistor, the transistor having a base, the base directly coupled to the current source capacitor and the resistor, and an emitter, the emitter directly coupled to the capacitor.

2. The circuitry of claim 1, wherein the current source reduces a ripple current flowing into the battery.

3. The circuitry of claim 1, wherein the current directed away from the battery is generated at a terminal of the transistor.

4. The circuitry of claim 1, wherein the eNoise is produced by a ripple current flowing through the battery.

5. The circuitry of claim 4, wherein the current source diverts the ripple current towards the main board of the audio playback system.

6. The circuitry of claim 1, further comprising battery monitoring circuitry coupled in series between the battery and the current source.

7. The circuitry of claim 6, wherein the battery, the battery monitoring circuitry, and the current source are all electrically coupled in parallel with the decoupling capacitor.

8. The circuitry of claim 1, wherein the audio playback system is an earbud.

9. A system for reducing eNoise in an audio playback system, the system comprising:
   a decoupling capacitor associated with a system decoupling impedance in the system;
   a noise source electrically coupled in parallel to the decoupling capacitor, the noise source representing eNoise in the circuitry, wherein the eNoise is produced by a ripple current flowing through the battery;
   a battery electrically coupled in parallel with the decoupling capacitance and the noise source, the battery providing power to the audio playback system; and
   a circuit electrically coupled between the battery and the noise source, wherein the circuit reduces the eNoise in the circuitry by producing a current directed away from the battery, the circuit comprising:
      a current source capacitor;
      a resistor electrically coupled in series with the current source capacitor; and
      a transistor, the transistor having a base, the base directly coupled to the current source capacitor and the resistor, and an emitter, the emitter directly coupled to the capacitor.

10. A method of reducing eNoise in an audio playback system, the method comprising:
    providing power to an audio playback system using a battery;
    producing a current directed away from the battery using a transistor having a base, the base directly coupled to a current source capacitor and a resistor, the resistor coupled in series with the current source capacitor, and the transistor having an emitter, the emitter directly coupled to the current source capacitor, wherein the transistor, resistor, and current source capacitor are coupled in series to the battery and in parallel with a decoupling capacitor; and
    diverting a ripple current that produces the eNoise away from the battery and towards the main board of the audio playback system using the produced current.

11. The circuitry of claim 1, wherein
    the transistor is a bipolar junction transistor (BJT).

12. The system of claim 9, wherein the circuit is configured to generate the current directed away from the battery at a terminal of the transistor.

13. The system of claim 9, wherein
    the transistor is a bipolar junction transistor (BJT).

14. The system of claim 9, wherein the produced current diverts the ripple current towards the main board of the audio playback system.

15. The system of claim 9, wherein the audio playback system is an earbud.

16. The method of claim 10, wherein producing a current directed away from the battery using a transistor comprises producing a current directed away from the battery using a bipolar junction transistor (BJT).

17. The method of claim 10, wherein the current directed away from the battery is generated at a terminal of the transistor.

18. The system of claim 9, wherein the produced current reduces a ripple current flowing into the battery.

19. The method of claim 10, wherein the audio playback system is an earbud.

20. The method of claim 10, wherein the produced current diverts the ripple current towards the main board of the audio playback system.

* * * * *